Patented Jan. 1, 1929.

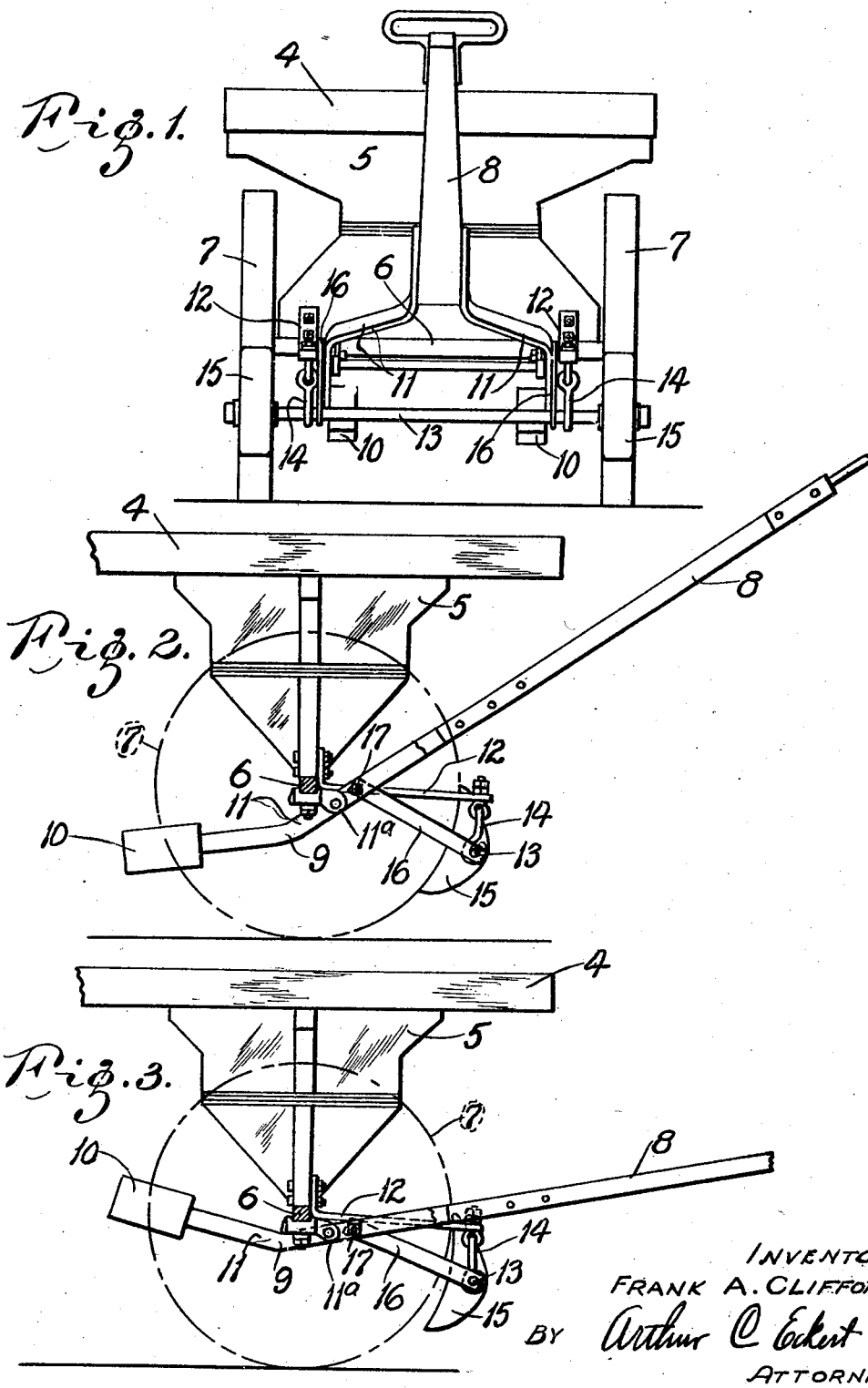

1,697,346

UNITED STATES PATENT OFFICE.

FRANK A. CLIFFORD, OF ST. LOUIS, MISSOURI, ASSIGNOR OF ONE-HALF TO HARRY H. HOPKINS, OF ST. LOUIS, MISSOURI.

TRUCK.

Application filed August 3, 1927. Serial No. 210,254.

The object of my device is to make an improvement on a truck, particularly manually operated platform or baggage trucks. The device is particularly applicable to the type of trucks that are used on the station platform of railroads. It becomes necessary in order to prevent accidents when the truck is not in use that the handle be not in an extended position on the floor but be in an upward non-operating position. When the handle lays on the floor when the truck is not being used, it offers an obstruction to a pedestrian which often causes him to stumble with a resultant injury. A second primal object is to automatically lock the wheels or a portion of them of the truck when the truck is not being used. In other words when the person pulling or pushing the truck releases his hold on the handle, it will automatically elevate itself and at the same time cause the engagement of brake shoes on the wheels or a portion of them, preventing the truck from rolling. This is important because damage and injury has frequently occurred by the truck rolling when it is left unattended. A further object of my device is to design a mechanism of the character described herein that can be easily and cheaply made of few and simple parts that lend themselves readily to multiple production, may be easily applied and removed and repaired.

With these and other objects in view, my invention has relation to certain novel features of construction and arrangement of parts as will be hereinafter more fully described, pointed out in the claim and illustrated in the drawing in which, Fig. 1 is a front elevation of the front wheels, axle, etc., with my device applied with a portion of the truck platform, showing the handle in its inoperative position and the brake shoe locked in engagement with the wheel.

Figure 2 is a side elevation of the front wheels, axle, etc. with my device applied with a portion of the truck platform, showing the handle in its inoperative position and the brake shoe locked in engagement with the wheel.

Fig. 3 is the same view as Fig. 2 with the exception that the handle is shown in operative position and the brake shoe is shown disengaged from the wheel. Numeral 4 designates the truck platform, numeral 5 the frame, numeral 6 the axle and numeral 7 the wheels. Only the front portion of the truck is shown. Numeral 8 designates the handle which has the weights 10 secured at its inner end to the prongs to be presently described. To the lower end of the handle 8 are secured the prongs 11 which are bent at 9. On the frame 5 beneath the axle 6 is secured the projection $11^a$. One of the prongs 11 of the handle 8 is secured to the projection $11^a$. The other prong 11 is likewise secured pivotally to another projection similar to $11^a$ formed on the frame 5 on the opposite side. To the frame 5 are secured the arms 12. Numeral 13 designates a brake beam which is rotatively secured to the brake beam hangers 14. The upper ends of the brake beam hangers 14 are pivotally secured to the ends of the arms 12. Numerals 15 designate brake shoes secured pivotally to the brake beam 13, one on each end in the plane of the wheels 7. Numeral 16 designates a connecting rod pivotally secured at one end to the brake beam 13 and at the other end to one of the prongs 11 at 17. This structure is duplicated on the opposite side adjacent the other prong 11.

The operation of my device is as follows. The weights 10 normally hold the handle 8 in the position shown in Fig. 2. The connecting rod 16 is of such length that in this position the brake shoes 15 are in engagement with the adjacent wheels. When the handle 8 is lowered and rotated on the projection 11 in a clockwise direction to the position shown in Fig. 3, the weights 10 are elevated and the brake shoes through the connecting rods 16 are forced away from the adjacent wheels into the position shown in Fig. 3. My device can be equally well applied to the rear wheels or by duplication may be applied to all of the wheels. It will be seen that the handle 8 is normally held in the position shown in Fig. 2 and that the brake shoes are normally in the position shown in Fig. 2. In the normal position the handle is out of the way and the wheels are locked by means of the brake shoes and the truck is prevented from rolling.

What I claim and mean to secure by Letters Patent is:

In combination with a truck, a frame, a handle, said handle pivotally secured to said frame and having an extension beyond the pivotal connection and a weight secured to said extension, a brake beam, brake shoes pivotally secured thereto, an arm secured to said frame and extending horizontally toward the front of the vehicle, brake beam hangers pivotally secured at the outer end of said arm and depending therefrom and to said brake beam, connecting rods pivotally suspended at one end from said handle and pivotally secured to the brake beam at the other end.

In testimony whereof I affix my signature.

FRANK A. CLIFFORD.